United States Patent [19]

Rhodes

[11] Patent Number: 5,167,675
[45] Date of Patent: Dec. 1, 1992

[54] REGENERATION SYSTEM FOR GLYCOL DEHYDRATOR

[75] Inventor: James E. Rhodes, Farmington, N. Mex.

[73] Assignee: Process Equipment and Service Company, Inc., Farmington, N. Mex.

[21] Appl. No.: 825,020

[22] Filed: Jan. 24, 1992

[51] Int. Cl.⁵ .................. B01D 53/14; B01D 19/00
[52] U.S. Cl. .......................... 55/32; 55/38; 55/48; 55/49; 55/51; 55/195; 55/208; 55/269
[58] Field of Search .............. 55/29, 32, 38, 48, 49, 55/51, 89, 189, 195, 208, 267, 269

[56] References Cited

U.S. PATENT DOCUMENTS

| | | | |
|---|---|---|---|
| 2,750,331 | 6/1956 | Meyers | 55/32 X |
| 2,812,827 | 11/1957 | Worley et al. | |
| 2,990,910 | 7/1961 | Kimmell | |
| 3,094,574 | 6/1963 | Glasgow et al. | 55/32 X |
| 3,348,601 | 10/1967 | Hill | 55/32 X |
| 3,651,617 | 3/1972 | Hodgson | 55/32 |
| 3,824,766 | 7/1974 | Valentine et al. | 55/48 |
| 3,975,229 | 8/1976 | Jackson | 55/32 X |
| 4,004,965 | 1/1977 | Jackson | 55/32 X |
| 4,280,867 | 7/1981 | Hodgson | 55/32 X |
| 4,674,446 | 6/1987 | Padilla, Sr. | 55/32 X |
| 4,753,664 | 6/1988 | Honerkamp et al. | 55/174 |

*Primary Examiner*—Robert Spitzer
*Attorney, Agent, or Firm*—Head & Johnson

[57] ABSTRACT

A glycol regeneration system for a dehydrator having an absorber for contact of gas with glycol, a pump to circulate glycol, a reboiler for heating glycol to vaporize water, and a still column for distilling the glycol vapor from the reboiler. The glycol regeneration system includes a reflux jacket chamber for receipt of the glycol from the absorber wherein the gas will separate by gravity from the glycol. A preheater in the reboiler will heat the gas separated in the reflux jacket chamber. The preheated gas is passed through the glycol in the reboiler to strip water vapor therefrom. At least one riser tube in communication with the still column will be in heat exchange relation with the glycol in the reflux jacket chamber to allow water vapor and waste gas to rise through the riser tube. At least one outlet in communication with the riser tube drains water vapor and waste gas therefrom.

7 Claims, 3 Drawing Sheets

REGENERATION SYSTEM FOR GLYCOL DEHYDRATOR

BACKGROUND OF THE INVENTION

1. Field of the Invention

The present invention is directed to a regeneration system to regenerate glycol for a dehydrator that removes water vapor from a gas stream.

2. Prior Art

Water vapor is an undesirable impurity in a gas stream. When the gas is compressed or cooled, the water vapor reverts to a liquid or solid phase. Liquid water can accelerate corrosion in pipelines and reduce the gas transmission efficiency. Water in the solid state forms icy hydrates, which can plug valves, fittings, and gas lines. To prevent these difficulties, some of the water vapor must be removed from the gas stream before it is transported in transmission lines.

A dehydrator removes water vapor from a gas stream produced from a natural gas well. There are a number of methods to accomplish dehydration, one of which is absorption. A hygroscopic liquid is used to remove the water vapor from the gas. Diethylene and triethylene glycol are two of the liquids often used for gas dehydration.

In the dehydration process, wet gas from the well is directed into the bottom of an absorber tank or chamber. The gas flows upward through a packed bed or through a series of bubble cap or valve trays filled with glycol where intimate contact is made. The gas gives up water vapor to the glycol. The dry gas leaves the absorber where it may flow into the sales or transmission line.

Dry, lean concentrated glycol is continuously pumped into the top of the absorber. As the glycol moves downward, it absorbs water vapor from the rising gas stream. The water-rich glycol is removed at the bottom of the absorber. The glycol is regenerated by removing the water vapor so that it may be reused.

A pump may be used to move glycol through the system. A gas-glycol pump is commonly used. The gas-glycol powered pump utilizes rich glycol under pressure in the absorber to furnish part of its required driving energy. Since the pump cannot get more glycol back than it pumped over, a supplemental volume is needed to provide the driving force. Gas, under pressure from the absorber, is taken in with the rich glycol to supply this additional volume.

The rich glycol, having gas entrained therein from the pump, is pumped to a reboiler where it is heated to a temperature to vaporize water in the glycol. A glycol-gas separator is sometimes employed to separate gas from the glycol prior to introduction into the reboiler. Additionally, the distillation process may be modified by the use of a stripping gas to strip additional water vapor.

A stripper or still column is normally located on top of the reboiler to separate the water and glycol. Packing is often used in the still column to encourage coalescence.

A reflux coil or other reflux mechanism may be utilized to condense vapor in the still column. An atmospheric condenser may be used to cool the steam vapors and recover the entrained glycol held by the gas.

In the present invention, the reflux coil or reflux mechanism as well as the glycol-gas separator have been eliminated. In their place, a reflux chamber jacket has been provided on top of the still column which utilizes cool rich glycol as a reflux medium. Additionally, the reflux jacket chamber is used to separate gas from the rich glycol. The separated gas is then utilized as a stripping gas in the reboiler.

Accordingly, it is a principal object and purpose of the present invention to provide a regeneration system employing a reflux jacket chamber that separates and captures waste gas introduced by the pump and flash gas dissolved in the glycol.

It is a further object and purpose of the present invention to provide a regeneration system employing a reflux jacket chamber that separates gas from glycol which operates at atmospheric pressure.

It is a further object and purpose of the present invention to provide a regeneration system employing a reflux jacket chamber that separates gas from glycol wherein the separated gas is used as a stripping medium to strip vapor from glycol.

SUMMARY OF THE INVENTION

The present invention is directed to a regeneration system for a dehydrator. Gas from a well is brought to an absorber. Water vapor is removed from the gas stream by dehydration in the absorber. In the absorber, the gas flows in intimate contact counter-currently with glycol. Dry gas leaves the absorber at the top thereof at a gas outlet. The dry gas is allowed to flow into a sales or transmission line for use.

Dry, lean concentrated glycol is continuously pumped into the absorber near the top of a glycol inlet. The water-rich glycol is removed at the bottom of the absorber through the glycol outlet. The rich glycol exiting the glycol outlet of the absorber is directed to a pump which utilizes the rich glycol under pressure from the absorber to furnish part of its required driving energy. Gas, under pressure from the absorber, is taken in with the rich glycol to supply additional volume and driving energy for the pump.

The rich glycol with entrained gas is forced from the pump to a reflux jacket chamber. The reflux jacket chamber is an elongated enclosed unit with a closed top and a bottom arranged vertically to the ground. Gravity causes gas in the rich glycol to separate so that the gas moves upward toward the top of the reflux chamber and the glycol settles downward.

The rich glycol is taken from the reflux jacket chamber and forced to a reboiler. The reboiler applies heat above the boiling point of water to separate glycol and water by distillation. The gas separated in the reflux jacket chamber is directed to the reboiler through an inlet into a preheat coil within the reboiler. The gas in the preheat coil is in heat exchange relationship with the glycol being heated in the reboiler. The gas is thus heated before being directed to a stripper tube containing a sparger tube therein. The stripper tube provides intimate contact between the hot gas and the lean glycol. The gas is used as a stripping gas to remove residual water from the glycol and the reboiler.

On top of the reboiler and in communication therewith, is a still column, water vapor, glycol vapor and gas rises from the reboiler through the still column where most of the glycol vapor condenses and falls back into the reboiler. The water vapor, remaining glycol vapor and waste gas rises through the still column and enters riser tubes which pass through the reflux jacket chamber. The riser tubes are in heat exchange relation with the rich glycol in the reflux jacket chamber. As the water vapor, remaining glycol vapor and waste gas rise through the riser tubes, the remaining glycol vapors will cool and condense. The riser tubes terminate in a plenum chamber. The plenum chamber is also in communication with a downcomer tube which passes through the entire length of the reflux jacket chamber. The water vapor and remaining waste gas will then be allowed to exit through a downcomer outlet.

DETAILED DESCRIPTION OF THE PREFERRED EMBODIMENT

Figure 1:
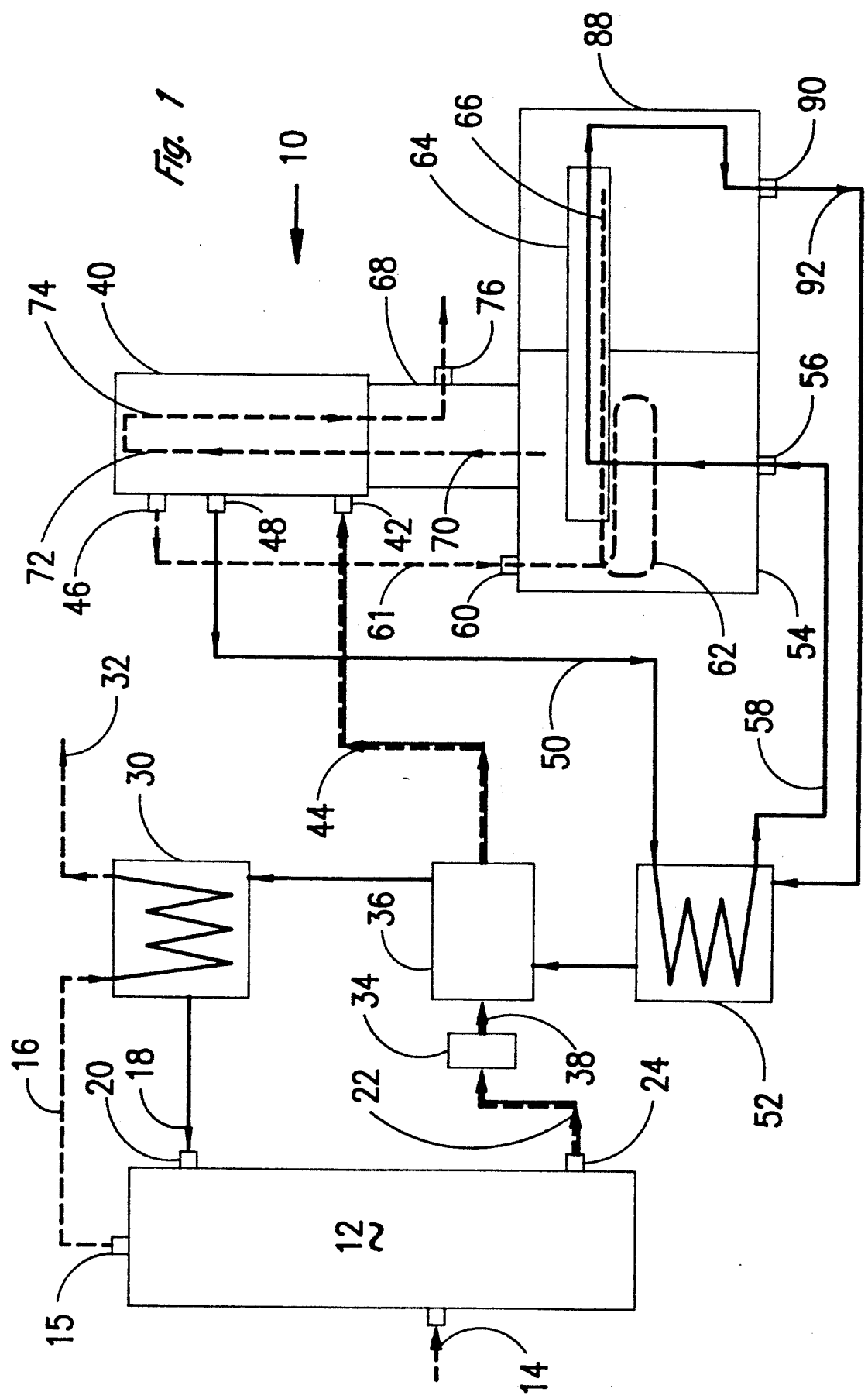
FIG. 1 illustrates a schematic block diagram of a glycol regeneration system constructed in accordance with the present invention.

Referring to the drawings in detail, FIG. 1 illustrates a schematic diagram of a regeneration system 10 for a dehydrator. Gas from a well is brought to the base of an absorber 12 as shown by arrow 14. Prior to introduction of the gas to the absorber, it may be passed through an optional inlet scrubber (not shown) which typically comprises a separator system which may be an integral part of the absorber or a separate vessel.

Water vapor is removed from the gas stream by dehydration in the absorber 12. A hygroscopic liquid, such as glycol, is used to remove the water vapor from the gas. Diethylene glycol and triethylene glycol are the principal glycols used for gas dehydration. Glycols have good hygroscopicity, stability to heat and chemical decomposition, and low vapor pressures. In the absorber, the gas flows upward through a packed bed or through a series of bubble cap or valve trays filled with glycol where intimate contact with the gas is made. The dry gas leaves absorber 12 near the top thereof at gas outlet 15 as shown by arrow 16.

Dry, lean concentrated glycol is continuously pumped into the absorber near the top as shown by arrow 18 through a glycol inlet 20. As the glycol moves downward, it absorbs water vapor from the rising gas stream. The water-rich glycol is removed at the bottom of the absorber as shown by arrow 22 through glycol outlet 24.

The absorber and its operation are well known in the prior art and do not form a part of the invention.

A glycol-gas heat exchanger 30 may be utilized which uses the dry gas leaving the absorber 12 to cool the lean glycol prior to entering the absorber 12. This heat exchanger 30 may be a coil at the top of the absorber or may be an external unit. After passing through the glycol-heat exchanger 30, dry gas is allowed to flow into a sales or transmission line as shown by arrow 32.

The rich glycol exiting the glycol outlet 24 of the absorber is often passed through a glycol filter 34 to remove solids and other impurities.

The rich glycol is thereafter directed to a pump 36 as shown by arrow 38. The circulating pump 36 utilizes the rich glycol under pressure from the absorber 12 to furnish part of its required driving energy. Gas, under pressure from the absorber 12, is taken in with the rich glycol to supply additional volume and driving energy for the pump. The gas entrained with the rich glycol will not enter the sales or transmission line and is sometimes termed "waste gas".

In the schematic diagram shown in FIG. 1, solid lines with arrows represent glycol flow while dashed lines with arrows represent gas flow.

The rich glycol with entrained gas is forced from the pump 36 to a reflux jacket chamber 40. The reflux jacket chamber inlet 42 as shown by arrows 44.

The reflux jacket chamber 40 is a closed unit as will be seen. The reflux jacket chamber is elongated with a closed top and a bottom arranged vertically to the ground. Gravity will cause gas in the rich glycol to separate so that the gas moves upward toward the top of the reflux jacket chamber 40 and the glycol settles downward.

This gas is removed from the reflux jacket chamber 40 via gas outlet 46. The retention time in the reflux jacket chamber may vary, although it has been found that a minimum average of five minutes is satisfactory to separate the gas dissolved in the glycol.

The reflux jacket chamber, thus, acts as a glycol-gas separator that captures waste gas from the pump and flash gas dissolved in the glycol. Unlike other glycol-gas separators, the reflux jacket chamber operates at atmospheric pressure. No automatic controls are required as it is filled by the pump and emptied by gravity.

The rich glycol is then forced out of the reflux jacket chamber 40 through glycol outlet 48.

As shown by arrow 50, the rich glycol may be directed through a glycol heat exchanger 52 which cools the lean glycol coming from the reboiler after regeneration and preheats the rich glycol which is going to a reboiler 54. The rich glycol is then forced to a reboiler 54 through a glycol inlet 56 as shown by arrow 58. The reboiler 54 applies heat above the boiling point of water to separate the glycol and water by simple distillation. The reboiler may be equipped with a direct fired firebox using a portion of the dehydrated gas for fuel. Alternatively, the reboiler may use hot oil or steam as are well known in the art.

The gas separated and removed from the glycol in the reflux jacket chamber 40 is directed to the reboiler through an inlet 60 as shown by arrow 61 to a preheat coil 62 within the reboiler.

The gas in the preheat coil 62 is in heat exchange relationship with the glycol heated in the reboiler. The gas is thus heated before being directed to a stripper tube 64 which contains a sparger tube 66 therein. The gas is used as a stripping gas to remove residual water from the glycol in the reboiler. The stripping gas provides intimate contact between the hot gas and lean glycol after most of the water has been removed by distillation.

The gas is allowed to bubble out of apertures (not shown) in the sparger tube 66 and through the glycol.

On top of the reboiler, and in communication therewith, is a still column 68. Liquid vapor will rise from the reboiler through the still column. Glycol vapors which coalesce will drop back down into the reboiler 54 and be heated. The passage of the water vapor through the still column 68 is shown by arrow 70. The water vapor and waste gas leaves the still column and enters riser tubes in the reflux jacket chamber shown by arrow 72.

Finally, the water vapor and waste gas will be allowed to drop down through a downcomer tube illustrated by arrow 74 to outlet 76.

Figure 2:
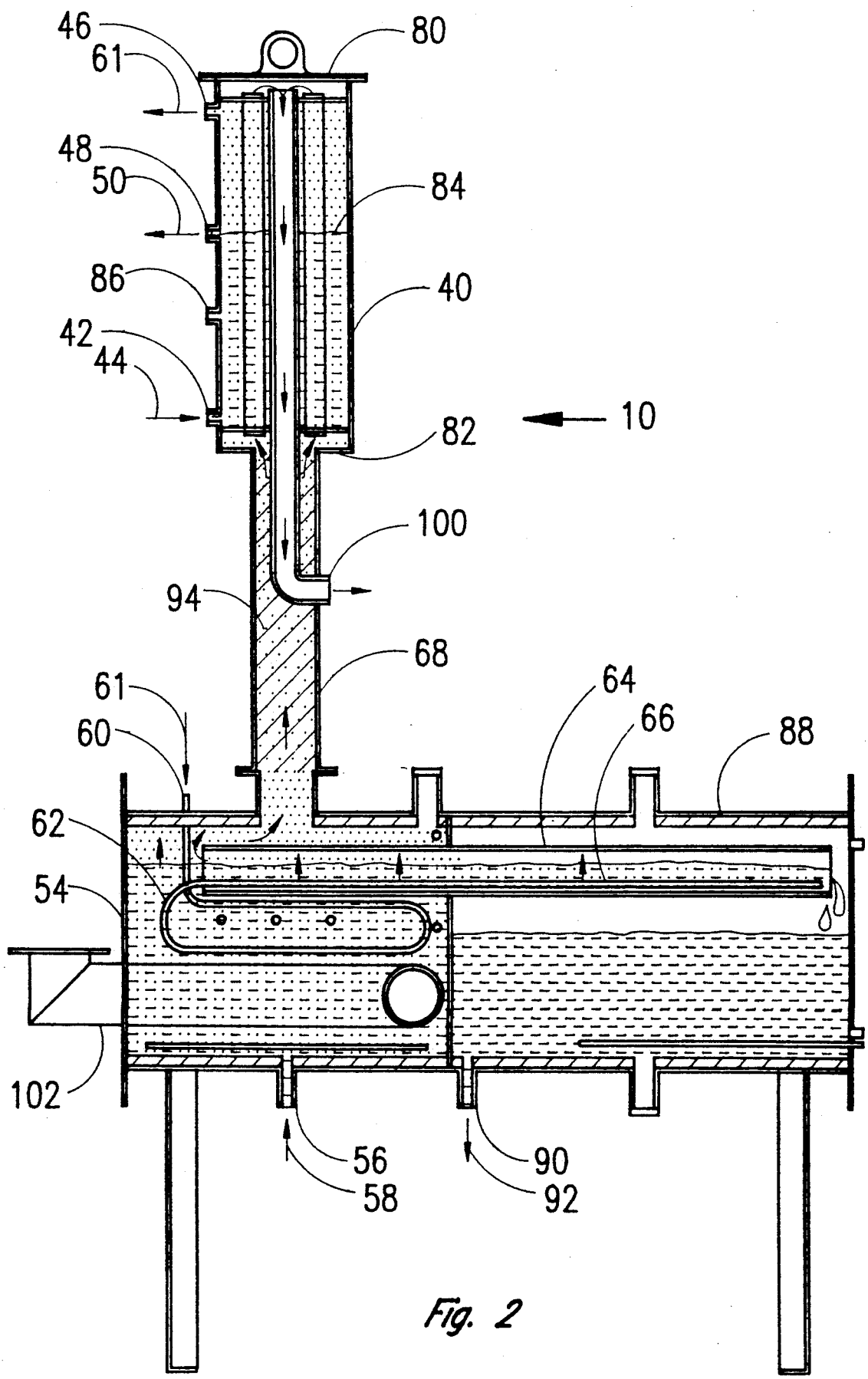
FIG. 2 illustrates a sectional view of a glycol regeneration system as shown in FIG. 1.

FIG. 2 illustrates a sectional view of a reboiler 54, still column 68 and reflux jacket chamber 40 to show the regeneration of the glycol.

Rich glycol, having been forced from the pump 36 (not seen in FIG. 2), is directed into the reflux jacket chamber 40 through glycol inlet 42. The reflux jacket chamber has a closed top 80 and a bottom 82. The reflux jacket chamber in the present embodiment is substantially cylindrical although it will be understood that other configurations are possible.

The rich glycol will be allowed to fill substantially the entire bottom portion of the reflux jacket chamber 40 with the exception of riser tubes to be described hereafter. The glycol in the reflux jacket chamber will be relatively cool. Gas that has been entrained in the rich glycol will separate by action of gravity so that the gas will move to the top of the chamber. The gas is illustrated by dots while the glycol is illustrated by a series of dots separated by dashed lines. The level of glycol in the chamber is illustrated at reference numeral 84. After the glycol has settled out of the gas, the rich glycol is removed from the reflux jacket chamber through outlet 48. An auxiliary glycol outlet 86 may also be provided.

The rich glycol is thereafter directed to the reboiler glycol inlet 56 shown at the base of the reboiler. A fire tube or other heating mechanism 102 heats the glycol. It has been found that reboiler temperatures can be lowered significantly when the present system is employed because adequate glycol purity can be achieved at lower temperatures.

The gas that has been separated from the glycol and reflux jacket chamber is directed through the gas outlet 46 shown by arrow 61 and to reboiler gas inlet 60 as illustrated by arrow 61. The gas, which is relatively cool, is heated in the preheat coil 62 and delivered to a sparger tube 66. It retains a number of apertures. A sparger tube is located within a stripper tube 64. In the present embodiment, the stripper tube is inched horizontally with respect to the reboiler. As the gases bubble through the sparger tube, it strips residual water in the glycol. Since the stripping gas is waste gas that was introduced by the pump and used to power the pump, the amount of gas available is proportional to the rate of the glycol being pumped. The stripping gas rate is therefore somewhat proportional.

The reboiler in the present embodiment is aligned with a storage tank 88. The lean glycol must travel through the stripper tube on its way out of the reboiler. The lean glycol in the storage tank 88 is allowed to exit the storage tank through outlet 90 and return to begin the system anew as shown by arrow 92.

The water vapor boiled off from the glycol in the reboiler 52 along with the remaining waste gas will rise upward into the still column 68 and through the packing 94 which is illustrated by the "X" pattern in FIG. 2.

Figures 3, 4:
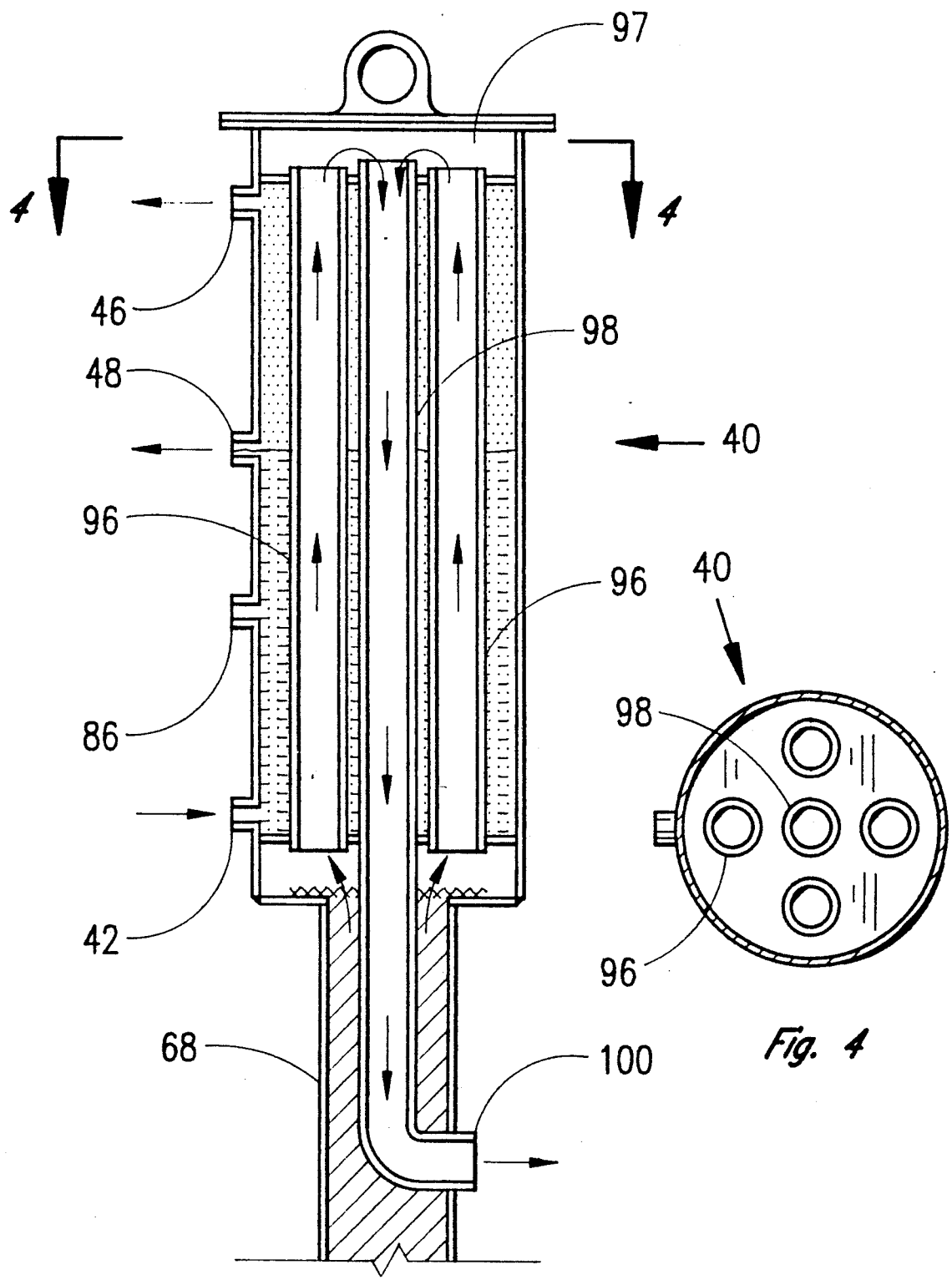
FIG. 3 illustrates an enlarged, sectional view of the reflux jacket chamber used as a part of the regeneration system shown in FIG. 1.
FIG. 4 illustrates a sectional view taken along section lines 4—4 of FIG. 3.

An enlarged view of the reflux jacket chamber is shown in FIG. 3. After the water vapor, remaining glycol vapor and waste gas rises through the still column, it will be allowed to enter a series of riser tubes 96 which are in heat exchange relation with the rich glycol in the reflux jacket chamber 40. As the water vapor, remaining glycol vapor and waste gas rise through the riser tubes, it will cool and the remaining glycol vapor will condense. The riser tubes terminate in a plenum chamber 97. The water vapor and waste gas are allowed to move down downcomer tube 98 which passes through the entire length of the reflux jacket chamber and terminates at outlet 100.

By taking the place and physical position of a reflux coil, the reflux jacket chamber enhances the reflux ability of the still column 68 and, therefore, cuts down on glycol loss from the still column. The cool, rich glycol in the reflux chamber absorbs energy from the rising vapors and causes glycol vapors to condense and fall back into the reboiler.

FIG. 3 is an enlarged sectional view of the reflux jacket chamber 40 that has been rotated from the FIG. 2 sectional.

FIG. 4 is a sectional view of the reflux jacket chamber taken along lines 4—4 of FIG. 3.

Whereas, the present invention has been described in relation to the drawings attached hereto, it should be understood that other and further modifications, apart from those shown or suggested herein, may be made within the spirit and scope of this invention.

What is claimed is:

1. A method to regenerate glycol in a dehydrator wherein gas is passed in contact with glycol in an absorber, water entrained in said gas being absorbed by said glycol, said glycol is thereafter heated in a reboiler to vaporize said water, and the vaporized water is passed to a still column in communication with said reboiler, which method to regenerate glycol comprises:
    (a) passing said glycol from said absorber into a reflux jacket chamber;
    (b) within said reflux jacket chamber, allowing gas entrained with said glycol to separate by gravity;
    (c) passing said gas from said reflux jacket chamber in heat exchange with said glycol in said reboiler to preheat said gas;
    (d) directing gas that has been preheated in step (c) to a sparger tube within said reboiler wherein said gas is bubbled through said glycol;
    (e) delivering said glycol from said reflux jacket chamber to said reboiler for heating wherein water will be vaporized and waste gas will rise into said still column;
    (f) allowing water vapor, remaining glycol vapor and waste gas to rise from said still column through at least one riser tube in heat exchange relation with said glycol in said reflux jacket chamber to cool said water vapor, remaining glycol vapor and waste gas; and
    (g) allowing glycol vapor to condense and fall back to said reboiler and allowing water vapor and waste gas to pass through a downcomer tube.

2. A method to regenerate glycol as set forth in claim 1 including pumping said glycol from said absorber into said reflux jacket chamber by a glycol circulating pump.

3. A glycol regeneration system for a dehydrator having an absorber for contact of gas with glycol, pump means to circulate glycol, a reboiler for heating said glycol to vaporize water, and a still column for distilling glycol vapor, which glycol regeneration system comprises:
    (a) a reflux jacket chamber for receipt of said glycol from said absorber wherein said gas will separate by gravity from said glycol and rise in said chamber;
    (b) pre-heat means in said reboiler to heat said gas separated in said reflux jacket chamber;
    (c) stripper means wherein said gas heated by said pre-heat means is passed through said glycol in said reboiler to strip water vapor therefrom;

(d) at least one riser tube in communication with said still column, said at least one riser tube in heat exchange relation with said glycol in said reflux jacket chamber to allow water vapor, remaining glycol vapor and waste gas to rise through said at least one riser tube; and (e) at least one downcomer tube in communication with said at least one riser tube to drain water vapor and waste gas therefrom.

4. A regeneration system as set forth in claim 3 wherein said reflux jacket chamber is located at the top of said still column, wherein said at least one riser tube passes through said reflux jacket chamber and terminates in a plenum within said reflux jacket chamber, said plenum being in communication with said at least one downcomer tube.

5. A glycol regeneration system as set forth in claim 3 wherein said stripper means includes a sparger tube in communication with said preheat means to distribute said gas in a stripping tube within said reboiler.

6. A glycol regeneration system as set forth in claim 3 wherein said reflux jacket chamber is elongated and includes a lower end and a sealed upper end, wherein said at least one riser tube is in communication with said still column and wherein said reflux jacket chamber has an inlet for said glycol from said absorber near said lower end of said reflux jacket chamber.

7. A glycol regeneration system as set forth in claim 3 wherein said preheat means includes a coil for passing said gas in heat exchanger relation with said glycol.

* * * * *